United States Patent
Simili et al.

(10) Patent No.: US 10,608,567 B1
(45) Date of Patent: Mar. 31, 2020

(54) DETERMINATION OF DEMAGNETIZED TORQUE CAPABILITY IN REAL-TIME FOR ELECTRIC MOTOR IN PROPULSION SYSTEM

(71) Applicant: GM Global Technology Operations LLC, Detroit, MI (US)

(72) Inventors: Dwarakanath V. Simili, Oakland Township, MI (US); Siddharth Ballal, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/283,060

(22) Filed: Feb. 22, 2019

(51) Int. Cl.
  *H02P 21/20* (2016.01)
  *H02P 21/26* (2016.01)
  *H02P 21/22* (2016.01)

(52) U.S. Cl.
  CPC .............. *H02P 21/20* (2016.02); *H02P 21/22* (2016.02); *H02P 21/26* (2016.02)

(58) Field of Classification Search
  None
  See application file for complete search history.

(56) References Cited

U.S. PATENT DOCUMENTS

| | | | | |
|---|---|---|---|---|
| 3,584,276 A * | 6/1971 | Ringland | ............. | H02K 19/103 318/721 |
| 2011/0144843 A1* | 6/2011 | Wu | ........................ | B60L 15/025 701/22 |
| 2013/0002173 A1* | 1/2013 | Baglino | .............. | B60L 11/1872 318/139 |
| 2014/0125258 A1* | 5/2014 | Fulton | ................... | H02J 7/1446 318/139 |
| 2018/0198395 A1* | 7/2018 | Gieras | ....................... | H02P 9/32 |

* cited by examiner

*Primary Examiner* — Bentsu Ro
(74) *Attorney, Agent, or Firm* — Quinn IP Law

(57) ABSTRACT

A propulsion system for a device having an electric motor configured to selectively provide a first torque contribution to propel the device. At least one sensor is configured to obtain a respective signal related to the electric motor. A controller is in communication with the sensors and configured to determine a magnet flux linkage ($\lambda_m$) based in part on the respective signal. The controller has a processor and tangible, non-transitory memory on which instructions are recorded for a method of determining a demagnetized torque capability ($T_D$) for the electric motor in real-time. In the event of a threshold level of demagnetization of the electric motor, the method estimates the torque capability in real time of the electric motor, taking the demagnetization level into account. At least one operating parameter of the device is controlled based at least partially on the demagnetized torque capability ($T_D$).

20 Claims, 2 Drawing Sheets

US 10,608,567 B1

DETERMINATION OF DEMAGNETIZED TORQUE CAPABILITY IN REAL-TIME FOR ELECTRIC MOTOR IN PROPULSION SYSTEM

INTRODUCTION

The disclosure relates generally to a propulsion system for a device having an electric motor and corresponding method. More specifically, the disclosure relates to determination of torque capability for the electric motor under demagnetization. The use of purely electric vehicles and hybrid vehicles, such as battery electric vehicles, window extended electric vehicles, hybrid electric vehicles, plug-in hybrid electric vehicles and fuel cell hybrid electric vehicles, has greatly increased over the last few years. Propulsion for the hybrid electric vehicles and other electric-powered transportation devices may be provided by electric motors. Many electric motors include permanent magnets which may demagnetize over time due to various reasons such as, temperature, age, specific events, affecting performance of the electric motor.

SUMMARY

Disclosed herein is a propulsion system for a device having an electric motor. The electric motor is configured to selectively provide a first torque contribution to propel the device, and includes a stator and a rotor. At least one sensor is configured to obtain a respective signal related to the electric motor. A controller is in communication with the sensors and configured to determine a magnet flux linkage ($\lambda_M$) of the rotor based in part on the respective signal. The controller has a processor and tangible, non-transitory memory on which instructions are recorded for a method of determining a demagnetized torque capability ($T_D$) for the electric motor in real-time. In the event of a threshold level of demagnetization of the electric motor, the method estimates the torque capability in real time of the electric motor, taking the demagnetization level into account, which may be communicated to multiple controllers across the operating space.

Execution of the instructions by the processor causes the controller to determine if the magnet flux linkage ($\lambda_M$) is less than a predefined threshold flux ($\lambda_T$). The controller is configured to determine a demagnetized base speed ($\omega_b$) based in part on the magnet flux linkage ($\lambda_M$) and a maximum available voltage ($V_m$), when the magnet flux linkage ($\lambda_m$) is less than the predefined threshold flux ($\lambda_T$). A demagnetized torque capability ($T_D$) is obtained based in part on the demagnetized base speed ($\omega_b$), a blend factor (K), a high-speed available torque ($T_{HS}$) and a low-speed available torque ($T_{LS}$). The controller is configured to control at least one operating parameter of the device based at least partially on the demagnetized torque capability ($T_D$).

The propulsion system may include a secondary source configured to selectively provide a second torque contribution to propel the device. Controlling at least one operating parameter of the device may include increasing the second torque contribution relative to the first torque contribution, based on a magnitude of the demagnetized torque capability ($T_D$).

The demagnetized torque capability ($T_D$) is obtained as a function of the blend factor (K), the high-speed available torque ($T_{HS}$) and the low-speed available torque ($T_{LS}$) such that: $T_D = K \cdot T_{HS} + (1-K) \cdot T_{LS}$. The blend factor is set to zero (K=0) when a rotor electrical speed ($\omega_e$) is less than or equal to a difference ($\omega_b - \Delta\omega$) between the demagnetized base speed ($\omega_b$) and a predefined calibration range ($\Delta\omega$). The blend factor is set to one (K=1) when the rotor electrical speed ($\omega_e$) is greater than a sum ($\omega_b + \Delta\omega$) of the demagnetized base speed ($\omega_b$) and the predefined calibration range ($\Delta\omega$). When the rotor electrical speed ($\omega_e$) is less than or equal to the sum ($\omega_b + \Delta\omega$) and greater than the difference ($\omega_b - \Delta\omega$), the blend factor (K) is obtained as:

$$K = \frac{(\omega_e - (\omega_b - \Delta\omega))}{2\Delta\omega}.$$

In one example, the magnet flux linkage ($\lambda_M$) is obtained from a look-up table based in part on a temperature of the rotor. Prior to obtaining the demagnetized base speed ($\omega_b$), the controller is configured to determine a nominal d-axis static inductance ($L_{dN}$) and a nominal q-axis static inductance ($L_{qN}$) based in part on a predefined nominal d-axis stator current command ($i_{dN}$) and a predefined nominal q-axis stator current command ($i_{qN}$). An initial d-axis stator current command ($i_{dI}$) and an initial q-axis stator current command ($i_{qI}$) are determined based at least partially on the nominal d-axis static inductance ($L_{dN}$), the nominal q-axis static inductance ($L_{qN}$), a maximum rated stator current ($I_R$) and the magnet flux linkage ($\lambda_M$). A d-axis static inductance ($L_{d0}$) and a q-axis static inductance ($L_{q0}$) are determined based in part on the initial d-axis stator current command ($i_{dI}$) and the initial q-axis stator current command ($i_{qI}$).

The controller may be configured to determine the demagnetized base speed ($\omega_b$) based in part on the magnet flux linkage ($\lambda_M$), the maximum available voltage ($V_m$), a d-axis stator current command ($i_{d0}$), a q-axis stator current command ($i_{q0}$), a d-axis static inductance ($L_{d0}$) and a q-axis static inductance ($L_{q0}$) such that:

$$\omega_b = \frac{V_m}{\sqrt{(L_{d0} i_{d0} + \lambda_M)^2 + (L_{q0} i_{q0})^2}}.$$

The controller may be configured to determine the d-axis stator current command ($i_{d0}$) based in part on the magnet flux linkage ($\lambda_M$), the maximum rated stator current ($I_R$), the d-axis static inductance ($L_{d0}$) and the q-axis static inductance ($L_{q0}$) such that:

$$i_{d0} = \frac{-\lambda_M + \sqrt{\lambda_M^2 + 8(L_{d0} - L_{q0})^2 I_R^2}}{4(L_{d0} - L_{q0})}.$$

The q-axis stator current command ($i_{q0}$) may be determined based in part on the maximum rated stator current ($I_R$) and the d-axis stator current command ($i_{d0}$) such that:

$$i_{q0} = \sqrt{I_R^2 - i_{d0}^2}.$$

The propulsion system may include a direct current (DC) power source configured to provide a DC link voltage ($V_{dc}$) to the electric motor. The controller may be configured to determine a d-axis maximum stator current command ($i_d^*$) and a q-axis maximum stator current command ($i_q^*$) based in part on the DC link voltage ($V_{dc}$) and a rotor mechanical speed ($\omega_m$). A d-axis maximum stator inductance ($L_d^*$) and a q-axis maximum stator inductance ($L_q^*$) are determined based in part on the d-axis maximum stator current command ($i_d^*$) and the q-axis stator current command ($i_q^*$).

The controller may be configured to obtain the low-speed available torque ($T_{LS}$) based in part on a number of pole pairs (P), the magnet flux linkage ($\lambda_M$), the d-axis maximum stator inductance ($L_d^*$), the q-axis maximum stator inductance ($L_q^*$), the d-axis maximum stator current command ($i_d^*$) and the q-axis maximum stator current command ($i_q^*$) such that:

$$T_{LS} = \frac{3P}{2}(\lambda_M + (L_d^* - L_q^*)i_d^*)i_q^*.$$

The controller may be configured to obtain the high-speed available torque ($T_{HS}$) based in part on a number of pole pairs (P), a stator resistance ($R_s$), a rotor electrical speed ($\omega_e$), the maximum available voltage ($V_m$), the d-axis maximum stator current command ($i_d^*$), the q-axis maximum stator current command ($i_q^*$), the magnet flux linkage ($\lambda_M$), the d-axis maximum stator inductance ($L_d^*$) and the q-axis maximum stator inductance ($L_q^*$) such that:

$$T_{HS} = \frac{3P}{2}\frac{1}{2R_s\omega_e}(V_m^2 - (R_s^2(i_d^{*2} + i_q^{*2})) - \omega_e^2(i_q^{*2}L_q^{*2} + (\lambda_M + i_d^*L_d^*)^2)).$$

The above features and advantages and other features and advantages of the present disclosure are readily apparent from the following detailed description of the best modes for carrying out the disclosure when taken in connection with the accompanying drawings.

DETAILED DESCRIPTION

Figure 1:
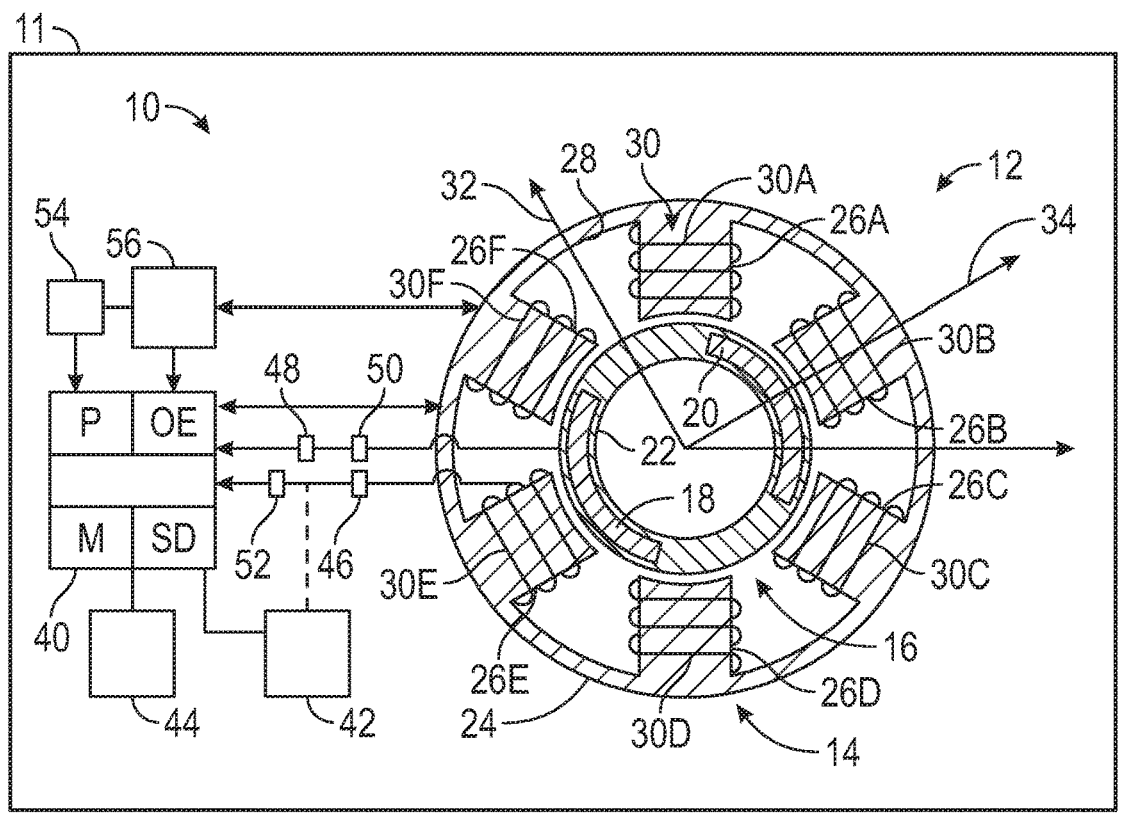
FIG. 1 is a schematic fragmentary partly sectional view of a propulsion system for a device having an electric motor and a controller.

Referring to the drawings, wherein like reference numbers refer to like components, FIG. 1 schematically illustrates a propulsion system 10 for a device 11. The device 11 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The device 11 may take many different forms and include multiple and/or alternate components and facilities.

Referring to FIG. 1, the device 11 includes an electric motor 12 having a stator 14, and a rotor 16 which includes at least one permanent magnet. The rotor 16 may include a first permanent magnet 18 and a second permanent magnet 20 of alternating polarity around the outer periphery of a rotor core 22. The rotor 16 may include as many permanent magnets as required per the application; for simplicity two are shown. The rotor 16 defines a rotor electrical speed ($\omega_e$) and a rotor mechanical frequency ($\omega_m$), which are related as ($\omega_e=(P/2)*\omega_m$), where P is the number of pole pairs. While the embodiment shown in FIG. 1 illustrates a three-phase, single pole pair (i.e. two poles) machine, it is understood that the number of phases or pole pairs may be varied.

Referring to FIG. 1, the stator 14 includes a stator core 24 which may be cylindrically shaped with a hollow interior. The stator core 24 may include a plurality of inwardly-protruding stator teeth 26A-F, separated by gaps or slots 28. In the embodiment shown in FIG. 1, stator windings 30 may be operatively connected to the stator core 24, such as for example, being coiled around the stator teeth 26A-F. The electric motor 12 may include, but is not limited to, synchronous machines. While an example electric motor 12 is shown, the components illustrated in the FIG. are not intended to be limiting. Indeed, additional or alternative components and/or implementations may be used.

The stator 14 is configured to have electric current, referred to herein as stator current, flowing in the stator windings 30 and causing a rotating magnetic field in the stator 14. Referring to FIG. 1, the stator windings 30 may include six sets of windings; one set for each of three phases (the first phase through stator windings 30A and 30D, the second phase through stator windings 30B and 30E and the third phase through stator windings 30C and 30F). Alternatively, slip rings or brushes (not shown) may be employed. Referring to FIG. 1, a quadrature magnetic axis 32 (referred to herein as q-axis) and a direct magnetic axis 34 (referred to herein as d-axis) are shown. The first and second permanent magnets 18, 20 aid in the creation of a magnetic field and magnet flux linkage.

Referring to FIG. 1, the propulsion system 10 includes a controller 40 in communication, such as electronic communication, with the electric motor 12. Referring to FIG. 1 and as described below, the controller 40 includes an online torque estimation module OE and a stored data module SD. The electric motor 12 is configured to provide a first torque contribution to a component of the device 11, such as for example, one or more wheels 42. The propulsion system 10 may include a secondary source 44, such as an internal combustion engine, configured to selectively provide a second torque contribution to propel the device 11, through the wheels 42, for example.

Figure 3:
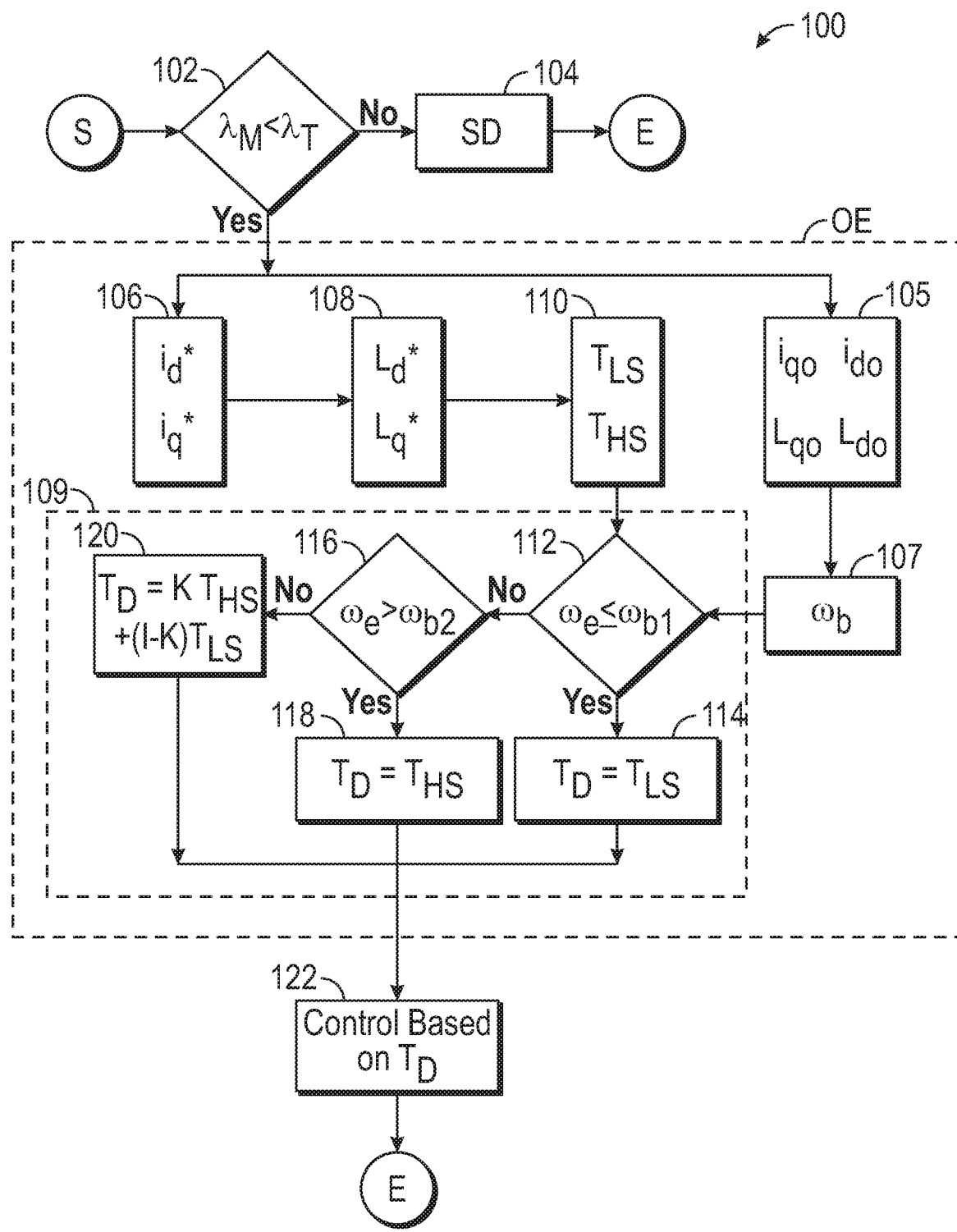
FIG. 3 is a flowchart for a method executable by the controller of FIG. 1.

The controller 40 includes at least one processor P and at least one memory M (or non-transitory, tangible computer readable storage medium) on which are recorded instructions for executing method 100, shown in FIG. 3. In the event of a threshold level of demagnetization of the electric motor 12, the method 100 generates a demagnetized torque capability ($T_D$), which accounts for the state of demagnetization of the electric motor 12. The demagnetized torque capability ($T_D$) may be communicated to multiple controllers across the operating space. The demagnetized torque capability ($T_D$) may be consumed by the controller 40 to optimize the relative torque contribution from the electric motor 12 and the secondary source 44. The memory M can store controller-executable instruction sets, and the processor P can execute the controller-executable instruction sets stored in the memory M.

The controller 40 of FIG. 1 is specifically programmed to execute the blocks of the method 100 (as discussed in detail below with respect to FIG. 3) and may receive inputs from one or more sensors. Referring to FIG. 1, the propulsion system 10 may include a stator winding temperature sensor 46, a rotor temperature sensor 48, and a magnet flux linkage observer 50, each capable of measuring a respective physical factor and sending a respective signal to the controller 40.

Additionally, controller 40 may be programmed to determine the respective physical factors by inputting the respective signals into a model or other estimation technique available to those skilled in the art. The propulsion system 10 may include a rotor position transducer 52 that measures the position of the rotor 16 and generates a rotor position signal.

Referring to FIG. 1, a direct current (DC) power source 54 is configured to provide a DC link voltage ($V_{dc}$) to the electric motor 12. A pulse width modulated (PWM) inverter 56 may be operatively connected to the controller 40 and the DC power source 54, and configured to convert DC current to alternating (AC) current.

Figure 2:
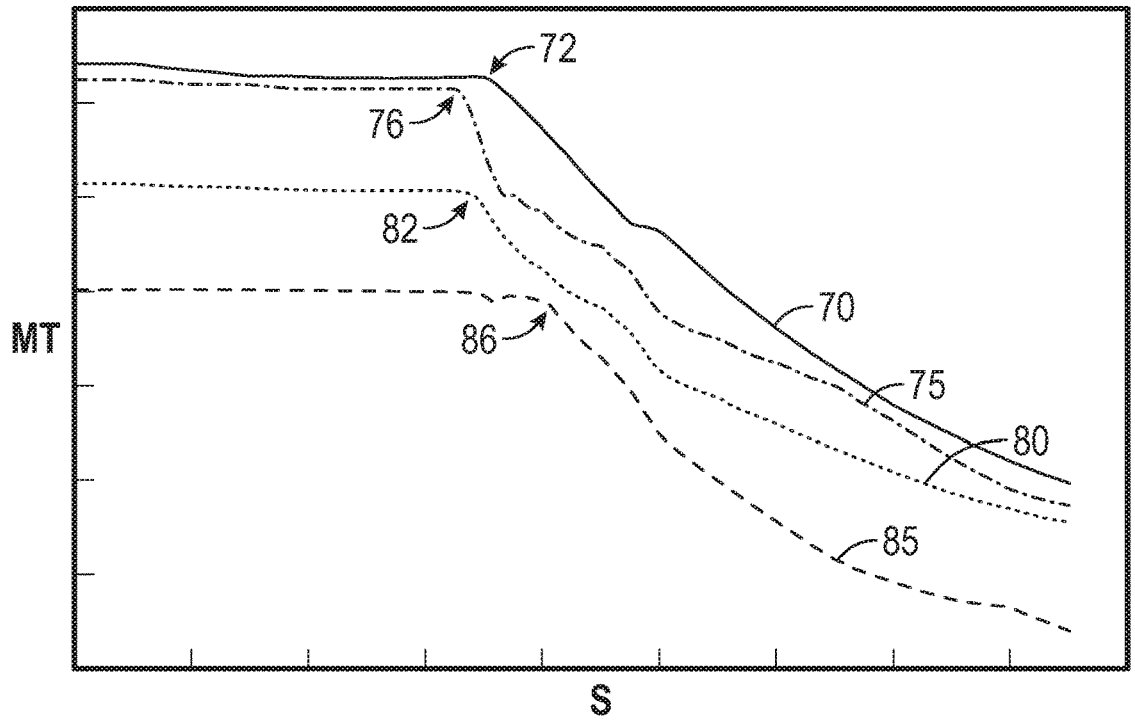
FIG. 2 is an example graph showing motor torque (MT) on the vertical axis and the speed (S) of the electric motor on the horizontal axis.

Referring now to FIG. 2, a plurality of traces showing the motor torque generated ("MT" in FIG. 2) as a function of electric motor speed ("S" in FIG. 2). Trace 70 shows the motor torque MT obtained from a mathematical characterization or model, with 0% demagnetization of the electric motor 12. Trace 75 shows empirical data of motor torque MT with 0% demagnetization. Trace 80 shows empirical data of motor torque MT with 25% demagnetization. Trace 85 shows empirical data of motor torque MT with 50% demagnetization. The traces 70, 75, 80, 85 have a respective inflexion point 72, 76, 82 and 86, dividing a "low" electric motor speed region (where motor torque MT is relatively constant) from a "high" electric motor speed region (where motor torque MT declines rapidly). Comparing traces 75, 80, 85, the motor torque MT generated is reduced as the level of demagnetization of the electric motor 12 goes up, in both the "low" electric motor speed region and the "high" electric motor speed region.

Referring now to FIG. 3, a flowchart of the method 100 stored on and executable by the controller 40 of FIG. 1 is shown. Method 100 need not be applied in the specific order recited herein. Furthermore, it is to be understood that some blocks may be omitted. In block 102 of FIG. 3, the controller 40 is configured to determine if a magnet flux linkage ($\lambda_M$) is less than a predefined threshold flux ($\lambda_T$). The magnet flux linkage ($\lambda_M$) is the magnet flux of the rotor 16. For example, at 10% demagnetization, the magnet flux linkage ($\lambda_M$) will be 90% of its original value. In one example, the magnet flux linkage ($\lambda_M$) is obtained from a look-up table based in part on the rotor temperature obtained by the rotor temperature sensor 48. In another example, the magnet flux linkage ($\lambda_M$) is determined based on data from the magnet flux linkage observer 50 that may be calibrated with a physical model. Other methods available to those skilled in the art, such as a rotor temperature estimator or observer, may be employed. The predefined threshold flux ($\lambda_T$) may be chosen based on the application at hand. In one example, the predefined threshold flux ($\lambda_T$) is set to correspond to about 10% demagnetization of the electric motor 12. In another example, the predefined threshold flux ($\lambda_T$) is set to correspond to about 15% demagnetization.

When the magnet flux linkage ($\lambda_M$) is greater than the predefined threshold flux ($\lambda_T$), the method 100 proceeds to block 104, where the controller 40 is programmed to employ the stored data module SD (see FIG. 1) to determine the available torque. When the magnet flux linkage ($\lambda_M$) is less than the predefined threshold flux ($\lambda_T$), the controller 40 is programmed to employ the online torque estimation module OE, which includes blocks 105 to 120, inclusive. The method 100 proceeds to blocks 105 and 106 from block 102.

In block 105, the controller 40 is programmed to determine a d-axis stator current command ($i_{d0}$), a q-axis stator current command ($i_{q0}$), a d-axis static inductance ($L_{d0}$) and a q-axis static inductance ($L_{q0}$). The d-axis stator current command ($i_{d0}$) and the q-axis stator current command ($i_{q0}$) are computed based on the maximum rated stator current ($I_R$), the d-axis and q-axis static inductances and the magnet flux linkage ($\lambda_M$). The d-axis and q-axis static inductances may be obtained from 2-D lookup tables as a function of corresponding d-axis and q-axis stator current commands. The d-axis and q-axis stator current commands may be solved iteratively by updating the d-axis and q-axis static inductances at each step until the d-axis and q-axis stator current commands converge to respective values, as described below.

For example, the controller 40 may first set a predefined nominal d-axis stator current command ($i_{dN}$) and predefined nominal q-axis stator current command ($i_{qN}$), such as for example ($i_{dN}$=0, $i_{qN}$=0). Second, the controller 40 may determine a nominal d-axis static inductance ($L_{dN}$) and nominal q-axis static inductance ($L_{qN}$) corresponding to the predefined nominal d-axis stator current command ($i_{dN}$) and predefined nominal q-axis stator current command ($i_{qN}$), from a look up table. Third, the controller 40 may determine an initial d-axis stator current command ($i_{dI}$) and an initial q-axis stator current command ($i_{qI}$) based at least partially on the nominal d-axis static inductance ($L_{dN}$), the nominal q-axis static inductance ($L_{qN}$), a maximum rated stator current ($I_R$) and the magnet flux linkage ($\lambda_M$), as follows:

$$i_{dI} = \frac{-\lambda_M + \sqrt{\lambda_M^2 + 8(L_{dN} - L_{qN})^2 I_R^2}}{4(L_{dN} - L_{qN})}, \; i_{qI} = \sqrt{I_R^2 - i_{dI}^2}.$$

Fourth, the controller 40 may determine a d-axis static inductance ($L_{d0}$) and a q-axis static inductance ($L_{q0}$) corresponding to the initial d-axis stator current command ($i_{dI}$) and the initial q-axis stator current command ($i_{qI}$), from a look-up table. Fifth, the d-axis stator current command ($i_{d0}$) may be computed based on the magnet flux linkage ($\lambda_M$), the maximum rated stator current ($I_R$), the d-axis static inductance ($L_{d0}$) and the q-axis static inductance ($L_{q0}$) such that:

$$i_{d0} = \frac{-\lambda_M + \sqrt{\lambda_M^2 + 8(L_{d0} - L_{q0})^2 I_R^2}}{4(L_{d0} - L_{q0})}.$$

The q-axis stator current command ($i_{q0}$) may be computed based on the maximum rated stator current ($I_R$) and the d-axis stator current command ($i_{d0}$) such that:

$$i_{q0} = \sqrt{I_R^2 - i_{d0}^2}.$$

This iteration process may be repeated until the d-axis stator current command ($i_{d0}$) and the q-axis stator current command ($i_{q0}$) converge to respective values, with the d-axis static inductance ($L_{d0}$) and the q-axis static inductance ($L_{q0}$) updated (corresponding to the last-obtained stator current commands) at each iteration.

From block 105, the method 100 proceeds to block 107, where the controller 40 determines the demagnetized base speed ($\omega_b$) based in part on the magnet flux linkage ($\lambda_m$), the maximum available voltage ($V_m$) and the output of block 105 (the d-axis stator current command ($i_{d0}$), the q-axis stator current command ($i_{q0}$), the d-axis static inductance ($L_{d0}$), and the q-axis static inductance ($L_{q0}$)) such that:

$$\omega_b = \frac{V_m}{\sqrt{(L_{d0}i_{d0} + \lambda_M)^2 + (L_{q0}i_{q0})^2}}.$$

The maximum available voltage ($V_m$) may be obtained based on the type of pulse-width-modulation employed by the electric machine 12 and other factors. For example, $$\left(Vm = \frac{2*Vdc}{\pi}\right)$$

when a six-step pulse-width-modulation is employed and $$\left(Vm = \frac{Vdc}{\sqrt{3}}\right)$$

when a space vector pulse-width-modulation (SVPWM) is employed.

In block 106 of FIG. 3, the controller 40 determines a d-axis maximum stator current command ($i_d^*$) and a q-axis maximum stator current command ($i_q^*$) based on the DC link voltage ($V_{dc}$) and a rotor mechanical frequency ($\omega_m$), such as from a look-up table obtained in a laboratory or test cell conditions, from simulations or from finite element analysis (FEA) based methods. From block 106, the method 100 proceeds to block 108, where the controller 40 determines a d-axis maximum stator inductance ($L_d^*$) and a q-axis maximum stator inductance ($L_q^*$) corresponding to the output of block 106 (d-axis maximum stator current command ($i_d^*$) and q-axis maximum stator current command ($i_q^*$)).

From block 108, the method 100 proceeds to block 110, where the controller 40 is programmed to obtain the low-speed available torque ($T_{LS}$) and the high-speed available torque ($T_{HS}$). The low-speed available torque ($T_{LS}$) is based in part on a number of pole pairs (P), the magnet flux linkage ($\lambda_M$), the output of block 106 (d-axis maximum stator current command ($i_d^*$) and q-axis maximum stator current command ($i_q^*$)) and output of block 108 (d-axis maximum stator inductance ($L_d^*$), q-axis maximum stator inductance ($L_q^*$)) such that:

$$T_{LS} = \frac{3P}{2}(\lambda_M + (L_d^* - L_q^*)i_d^*)i_q^*.$$

The high-speed available torque ($T_{HS}$) is based in part on the number of pole pairs (P), the stator resistance ($R_s$), the rotor electrical speed ($\omega_e$), the maximum available voltage ($V_m$), the magnet flux linkage ($\lambda_m$) and the respective outputs of block 106 and block 108 such that:

$$T_{HS} = \frac{3P}{2}\frac{1}{2R_s\omega_e}(V_m^2 - (R_s^2(i_d^{*2} + i_q^{*2})) - \omega_e^2(i_q^{*2}L_q^{*2} + (\lambda_M + i_d^*L_d^*)^2)).$$

From blocks 107 and 110, the method 100 proceeds to block 109, where the controller 40 is programmed to determine the demagnetized torque capability ($T_D$) as $T_D = (K*T_{HS}(1-K)*T_{LS})$. Block 109 includes sub-blocks 112, 114, 116, 118 and 120. In sub-block 112, the controller 40 determines if the rotor electrical speed ($\omega_e$) is less than or equal to a difference ($\omega_b - \Delta\omega$) between the demagnetized base speed ($\omega_b$) and a predefined calibration range ($\Delta\omega$). For example, the predefined calibration range ($\Delta\omega$) may be set as between 500 and 1000 RPM. If so, the method 100 moves to sub-block 114. As shown in sub-block 114, when the rotor electrical speed ($\omega_e$) is less than or equal to the difference ($\omega_{b1}=(\omega_b-\Delta\omega)$) between the demagnetized base speed ($\omega_b$) and the predefined calibration range ($\Delta\omega$), the blend factor is set to zero (K=0) such that $T_D=T_{LS}$. If not, the method 100 moves to sub-block 116.

In sub-block 116 of FIG. 3, the controller 40 determines if the rotor electrical speed ($\omega_e$) is greater than a sum ($\omega_{b2}=(\omega_b+\Delta\omega)$) of the demagnetized base speed ($\omega_b$) and the predefined calibration range ($\Delta\omega$). If so, the method 100 moves to sub-block 118. As shown in sub-block 118, the blend factor is set to one (K=1) when the rotor electrical speed ($\omega_e$) is greater than the sum ($\omega_b+\Delta\omega$) of the demagnetized base speed ($\omega_b$) and the predefined calibration range ($\Delta\omega$), such that $T_D=T_{HS}$. If not, the method 100 moves to sub-block 120.

In sub-block 120 of FIG. 3, where the rotor electrical speed ($\omega_e$) is less than or equal to the sum ($\omega_b+\Delta\omega$) and greater than the difference ($\omega_b-\Delta\omega$), the controller 40 determines the blend factor (K) as a function of the rotor electrical speed ($\omega_e$), the demagnetized base speed ($\omega_b$) and the predefined calibration range ($\Delta\omega$) such that:

$$K = \frac{(\omega_e - (\omega_b - \Delta\omega))}{2\Delta\omega}.$$

The demagnetized torque capability ($T_D$) is obtained as: $T_D=(K*T_{HS}+(1-K)*T_{LS})$. The method 100 proceeds to block 122 from block 109.

In block 122 of FIG. 3, the controller 40 is configured to control an operating parameter of the device 11 based on the demagnetized torque capability ($T_D$). Controlling at least one operating parameter of the device 11 may include restricting the speed of the device 11 or switching to an alternative operating mode such as a limp-home mode. As previously noted, the propulsion system 10 may include a secondary source 44, such as an internal combustion engine, configured to selectively provide a second torque contribution to propel the device 11. Controlling at least one operating parameter of the device 11 may include increasing the second torque contribution relative to the first torque contribution, based on a magnitude of the demagnetized torque capability ($T_D$) and the torque demanded or needed by the device 11.

In summary, the method 100 utilizes demagnetization detection and formulates a voltage constraint equation to include stator resistance, in order to obtain a torque capability value that satisfies constraints at maximum current. The method 100 improves functioning of the device 11 by enabling the optimization of the relative torque contribution from the electric motor 12 and the secondary source 44 based on the torque capability of the electric motor 12 above a threshold demagnetization level.

The controller 40 of FIG. 1 may be an integral portion of, or a separate module operatively connected to, other controllers of the device 11. The controller 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A propulsion system for a device, the propulsion system comprising:
   an electric motor configured to selectively provide a first torque contribution to propel the device, the electric motor including a stator and a rotor;
   at least one sensor configured to obtain a respective signal related to the electric motor;
   a controller in communication with the at least one sensor and configured to determine a magnet flux linkage ($\lambda_M$) of the rotor based in part on the respective signal;
   wherein the controller has a processor and tangible, non-transitory memory on which instructions are recorded for a method of determining a demagnetized torque capability ($T_D$) for the electric motor in real-time, execution of the instructions by the processor causing the controller to:
   determine if the magnet flux linkage ($\lambda_M$) is less than a predefined threshold flux ($\lambda_T$);
   when the magnet flux linkage ($\lambda_M$) is less than the predefined threshold flux ($\lambda_T$), determine a demagnetized base speed ($\omega_b$) based in part on the magnet flux linkage ($\lambda_M$) and a maximum available voltage ($V_m$);
   determine a blend factor (K) based in part on the demagnetized base speed ($\omega_b$) and determine the demagnetized torque capability ($T_D$) based in part on the blend factor (K), a high-speed available torque ($T_{HS}$) and a low-speed available torque ($T_{LS}$); and
   control at least one operating parameter of the device based in part on the demagnetized torque capability ($T_D$).

2. The propulsion system of claim 1, further comprising:
   a secondary source configured to selectively provide a second torque contribution to propel the device; and
   wherein said controlling at least one operating parameter of the device includes increasing the second torque contribution relative to the first torque contribution, based on a magnitude of the demagnetized torque capability ($T_D$).

3. The propulsion system of claim 1, wherein the rotor defines a rotor electrical speed ($\omega_e$) and the controller is configured to:
   obtain the demagnetized torque capability ($T_D$) as $T_D = (K^*T_{HS} + (1-K)^*T_{LS})$;
   set the blend factor to zero (K=0) when the rotor electrical speed ($\omega_e$) is less than or equal to a difference ($\omega_b - \Delta\omega$) between the demagnetized base speed ($\omega_b$) and a predefined calibration range ($\Delta\omega$);
   set the blend factor to one (K=1) when the rotor electrical speed ($\omega_e$) is greater than a sum ($\omega_b + \Delta\omega$) of the demagnetized base speed ($\omega_b$) and the predefined calibration range ($\Delta\omega$); and
   obtain the blend factor (K) as:

$$K = \frac{(\omega_e - (\omega_b - \Delta\omega))}{2\Delta\omega},$$

when the rotor electrical speed ($\omega_e$) is less than or equal to the sum ($\omega_b + \Delta\omega$) and greater than the difference ($\omega_b - \Delta\omega$).

4. The propulsion system of claim 1, wherein:
   the at least one sensor is a rotor temperature sensor and the respective signal is a rotor temperature; and
   the controller is configured to obtain the magnet flux linkage ($\lambda_M$) from a look-up table based in part on the rotor temperature.

5. The propulsion system of claim 1, wherein the controller is configured to:
   determine the demagnetized base speed ($\omega_b$) based in part on the magnet flux linkage ($\lambda_M$), the maximum available voltage ($V_m$), a d-axis stator current command ($i_{d0}$), a q-axis stator current command ($i_{q0}$), a d-axis static inductance ($L_{d0}$) and a q-axis static inductance ($L_{q0}$) such that:

$$\omega_b = \frac{V_m}{\sqrt{(L_{d0}i_{d0} + \lambda_M)^2 + (L_{q0}i_{q0})^2}}.$$

6. The propulsion system of claim 5, wherein prior to determining the demagnetized base speed ($\omega_b$), the controller is configured to:

determine a nominal d-axis static inductance ($L_{dN}$) and a nominal q-axis static inductance ($L_{qN}$) based in part on a predefined nominal d-axis stator current command ($i_{dN}$) and a predefined nominal q-axis stator current command ($i_{qN}$);

determine an initial d-axis stator current command ($i_{dI}$) and an initial q-axis stator current command ($i_{qI}$) based at least partially on the nominal d-axis static inductance ($L_{dN}$), the nominal q-axis static inductance ($L_{qN}$), a maximum rated stator current ($I_R$) and the magnet flux linkage ($\lambda_M$); and determine a d-axis static inductance ($L_{d0}$) and a q-axis static inductance ($L_{q0}$) based in part on the initial d-axis stator current command ($i_{dI}$) and the initial q-axis stator current command ($i_{qI}$).

7. The propulsion system of claim 6, wherein the controller is configured to:

determine a d-axis stator current command ($i_{d0}$) based in part on the magnet flux linkage ($\lambda_M$), the maximum rated stator current ($I_R$), the d-axis static inductance ($L_{d0}$) and the q-axis static inductance ($L_q$) such that:

$$i_{d0} = \frac{-\lambda_M + \sqrt{\lambda_M^2 + 8(L_{d0} - L_{q0})^2 I_R^2}}{4(L_{d0} - L_{q0})}.$$

8. The propulsion system of claim 7, wherein the controller is configured to:

determine a q-axis stator current command ($i_{q0}$) based in part on the maximum rated stator current ($I_R$) and the d-axis stator current command ($i_{d0}$) such that:

$$i_{q0} = \sqrt{I_R^2 - i_{d0}^2}.$$

9. The propulsion system of claim 1, further comprising:

a direct current (DC) power source configured to provide a DC link voltage ($V_{dc}$) to the electric motor, the controller being configured to:

determine a d-axis maximum stator current command ($i_d^*$) and a q-axis maximum stator current command ($i_q^*$) based in part on the DC link voltage ($V_{dc}$) and a rotor mechanical frequency ($\omega_m$); and determine a d-axis maximum stator inductance ($L_d^*$) and a q-axis maximum stator inductance ($L_q^*$) based in part on the d-axis maximum stator current command ($i_d^*$) and the q-axis stator current command ($i_q^*$).

10. The propulsion system of claim 9, wherein the controller is configured to:

obtain the low-speed available torque ($T_{LS}$) based in part on a number of pole pairs (P), the magnet flux linkage ($\lambda_M$), the d-axis maximum stator inductance ($L_d^*$), the q-axis maximum stator inductance ($L_q^*$), the d-axis maximum stator current command ($i_d^*$) and the q-axis maximum stator current command ($i_q^*$) such that:

$$T_{LS} = \frac{3P}{2}(\lambda_M + (L_d^* - L_q^*)i_d^*)i_q^*.$$

11. The propulsion system of claim 9, wherein the controller is configured to:

obtain the high-speed available torque ($T_{HS}$) based in part on a number of pole pairs (P), a stator resistance ($R_s$), a rotor electrical speed ($\omega_e$), the maximum available voltage ($V_m$), the d-axis maximum stator current command ($i_d^*$), the q-axis maximum stator current command ($i_q^*$), the magnet flux linkage ($\lambda_M$), the d-axis maximum stator inductance ($L_d^*$) and the q-axis maximum stator inductance ($L_q^*$) such that:

$$T_{HS} = \frac{3P}{2}\frac{1}{2R_s\omega_e}(V_m^2 - (R_s^2(i_d^{*2} + i_q^{*2})) - \omega_e^2(i_q^{*2}L_q^{*2} + (\lambda_M + i_d^* L_d^*)^2)).$$

12. A method of operating a propulsion system in a device, the propulsion system having an electric motor with a stator and a rotor, at least one sensor, and a controller having a processor and tangible, non-transitory memory, the method comprising:

configuring the electric motor to selectively provide a first torque contribution to propel the device and configuring the at least one sensor to obtain a respective signal related to the electric motor;

programming the controller to determine a magnet flux linkage ($\lambda_M$) of the rotor based in part on the respective signal and determine if the magnet flux linkage ($\lambda_M$) is less than a predefined threshold flux ($\lambda_T$);

when the magnet flux linkage ($\lambda_M$) is less than the predefined threshold flux ($\lambda_T$), determining a demagnetized base speed ($\omega_b$) based in part on the magnet flux linkage ($\lambda_M$) and a maximum available voltage ($V_m$);

determining a blend factor (K) based in part on the demagnetized base speed ($\omega_b$) and determining a demagnetized torque capability ($T_D$) based in part on the blend factor (K), a high-speed available torque ($T_{HS}$) and a low-speed available torque ($T_{LS}$); and controlling at least one operating parameter of the device based in part on the demagnetized torque capability ($T_D$).

13. The method of claim 12, wherein the device includes a secondary source, the method further comprising:

configuring the secondary source to selectively provide a second torque contribution to propel the device; and wherein controlling at least one operating parameter of the device includes increasing the second torque contribution relative to the first torque contribution, based on a magnitude of the demagnetized torque capability ($T_D$).

14. The method of claim 12, wherein the rotor defines a rotor electrical speed ($\omega_e$), the method further comprising:

obtaining the demagnetized torque capability ($T_D$) as $T_D=(K*T_{HS}+(1-K)*T_{LS})$;

setting the blend factor to zero (K=0) when the rotor electrical speed ($\omega_e$) is less than or equal to a difference ($\omega_b - \Delta\omega$) between the demagnetized base speed ($\omega_b$) and a predefined calibration range ($\Delta\omega$);

setting the blend factor to one (K=1) when the rotor electrical speed ($\omega_e$) is greater than a sum ($\omega_b + \Delta\omega$) of the demagnetized base speed ($\omega_b$) and the predefined calibration range ($\Delta\omega$); and when the rotor electrical speed ($\omega_e$) is less than or equal to the sum ($\omega_b + \Delta\omega$) and greater than the difference ($\omega_b - \Delta\omega$), obtaining the blend factor (K) as:

$$K = \frac{(\omega_e - (\omega_b - \Delta\omega))}{2\Delta\omega}.$$

15. The method of claim 12, further comprising:
determining the demagnetized base speed ($\omega_b$) based in part on the magnet flux linkage ($\lambda_M$), the maximum available voltage ($V_m$), a d-axis stator current command ($i_{d0}$), a q-axis stator current command ($i_{q0}$), a d-axis static inductance ($L_{d0}$) and a q-axis static inductance ($L_{q0}$) such that:

$$\omega_b = \frac{V_m}{\sqrt{(L_{d0}i_{d0} + \lambda_M)^2 + (L_{q0}i_{q0})^2}}.$$

16. The method of claim 12, wherein the device includes a direct current (DC) power source configured to provide a DC link voltage ($V_{dc}$) to the electric motor, the method further comprising:
determining a d-axis maximum stator current command ($i_d^*$) and a q-axis maximum stator current command ($i_q^*$) based in part on the DC link voltage ($V_{dc}$) and a rotor mechanical frequency ($\omega_m$); and
determining a d-axis maximum stator inductance ($L_d^*$) and a q-axis maximum stator inductance ($L_q^*$) based in part on the d-axis maximum stator current command ($i_d^*$) and the q-axis maximum stator current command ($i_q^*$).

17. The method of claim 12, further comprising:
obtaining the low-speed available torque ($T_{LS}$) based in part on a number of pole pairs (P), the magnet flux linkage ($\lambda_M$), the d-axis maximum stator inductance ($L^*_d$), the q-axis maximum stator inductance ($L_q^*$), the d-axis maximum stator current command ($i_d^*$) and the q-axis stator current command ($i_q^*$) such that:

$$T_{LS} = \frac{3P}{2}(\lambda_M + (L_d^* - L_q^*)i_d^*)i_q^*.$$

18. The method of claim 12, further comprising:
obtaining the high-speed available torque ($T_{HS}$) based in part on a number of pole pairs (P), a stator resistance ($R_s$), a rotor electrical speed ($\omega_e$), the maximum available voltage ($V_m$), the d-axis maximum stator current command ($i_d^*$), the q-axis maximum stator current command ($i_q^*$), the magnet flux linkage ($\lambda_M$), the d-axis maximum stator inductance ($L_d^*$) and the q-axis maximum stator inductance ($L_q^*$) such that:

$$T_{HS} = \frac{3P}{2}\frac{1}{2R_s\omega_e}(V_m^2 - (R_s^2(i_d^{*2} + i_q^{*2})) - \omega_e^2(i_q^{*2}L_q^{*2} + (\lambda_M + i_d^*L_d^*)^2)).$$

19. The method of claim 12, further comprising, prior to determining the demagnetized base speed ($\omega_b$):
determining a nominal d-axis static inductance ($L_{dN}$) and a nominal q-axis static inductance ($L_{qN}$) based in part on a predefined nominal d-axis stator current command ($i_{dN}$) and a predefined nominal q-axis stator current command ($i_{qN}$);
determining an initial d-axis stator current command ($i_{dI}$) and an initial q-axis stator current command ($i_{qI}$) based at least partially on the nominal d-axis static inductance ($L_{dN}$), the nominal q-axis static inductance ($L_{qN}$), a maximum rated stator current ($I_R$) and the magnet flux linkage ($\lambda_M$); and
determining a d-axis static inductance ($L_{d0}$) and a q-axis static inductance ($L_{q0}$) based in part on the initial d-axis stator current command ($i_{dI}$) and the initial q-axis stator current command ($i_{qI}$).

20. The method of claim 19, further comprising:
determining the d-axis stator current command ($i_{d0}$) based in part on the magnet flux linkage ($\lambda_M$), the maximum rated stator current ($I_R$), the d-axis static inductance ($L_{d0}$) and the q-axis static inductance ($L_{q0}$) such that:

$$i_{d0} = \frac{-\lambda_M + \sqrt{\lambda_M^2 + 8(L_{d0} - L_{q0})^2 I_R^2}}{4(L_{d0} - L_{q0})};$$

and
determining the q-axis stator current command ($i_{q0}$) based in part on the maximum rated stator current ($I_R$) and the d-axis stator current command ($i_{d0}$) such that:

$$i_{q0} = \sqrt{I_R^2 - i_{d0}^2}.$$

* * * * *